US 12,528,789 B2

(12) United States Patent
Ruch et al.

(10) Patent No.: US 12,528,789 B2
(45) Date of Patent: Jan. 20, 2026

(54) ISOINDOLINE DERIVATIVES

(71) Applicant: BASF COLORS & EFFECTS GMBH, Ludwigshafen am Rhein (DE)

(72) Inventors: Thomas Ruch, Basel (CH); Patrick Holzhueter, Zell im Wiesental (DE); Gerardus Dekeyzer, Schweizerhalle (CH); Roman Lenz, Liestal (CH)

(73) Assignee: SUN CHEMICAL B.V., Weesp (NL)

( * ) Notice: Subject to any disclaimer, the term of this patent is extended or adjusted under 35 U.S.C. 154(b) by 952 days.

(21) Appl. No.: 17/764,471

(22) PCT Filed: Sep. 30, 2020

(86) PCT No.: PCT/EP2020/077323
§ 371 (c)(1),
(2) Date: Mar. 28, 2022

(87) PCT Pub. No.: WO2021/063999
PCT Pub. Date: Apr. 8, 2021

(65) Prior Publication Data
US 2022/0356171 A1    Nov. 10, 2022

(30) Foreign Application Priority Data
Sep. 30, 2019    (EP) .................................... 19200455

(51) Int. Cl.
| C07D 403/04 | (2006.01) |
| C07D 209/40 | (2006.01) |
| C07D 403/12 | (2006.01) |
| C07D 403/14 | (2006.01) |
| C09B 57/04 | (2006.01) |
| C09B 67/00 | (2006.01) |

(52) U.S. Cl.
CPC ......... *C07D 403/04* (2013.01); *C07D 209/40* (2013.01); *C07D 403/12* (2013.01); *C07D 403/14* (2013.01); *C09B 57/04* (2013.01); *C09B 67/0001* (2013.01)

(58) Field of Classification Search
CPC .................................................. C07D 403/04
See application file for complete search history.

(56) References Cited

U.S. PATENT DOCUMENTS

| 4,022,770 | A | 5/1977 | L Eplattenier et al. |
| 4,237,293 | A | 12/1980 | L Eplattenier et al. |
| 4,340,735 | A | 7/1982 | Lotsch et al. |
| 4,764,217 | A | 8/1988 | Von Der Crone et al. |
| 4,866,113 | A | 9/1989 | Bitterli et al. |
| 5,484,901 | A | 1/1996 | Krapp et al. |
| 2009/0017273 | A1 | 1/2009 | Shimada et al. |
| 2016/0327710 | A1 | 11/2016 | Murakami |

FOREIGN PATENT DOCUMENTS

| DE | 2936748 A1 | 4/1981 |
| GB | 2177105 A | 1/1987 |
| JP | S50-109920 | 8/1975 |
| JP | H07-258565 A | 10/1995 |
| JP | 2006-146078 A | 6/2006 |
| JP | 2007-112876 A | 5/2007 |
| JP | 2012-236882 A | 12/2012 |
| JP | 2018-062644 A | 4/2018 |
| JP | 2019-113671 A | 7/2019 |
| WO | 2008/101841 A1 | 8/2008 |
| WO | 2020/002106 A2 | 1/2020 |

OTHER PUBLICATIONS

ISA/EP, "PCT International Search Report and Written Opinion", issued in connection with PCT Application No. PCT/EP2020/077323, which was mailed on Jan. 11, 2021, 10 pages.

*Primary Examiner* — Brian E Mcdowell
(74) *Attorney, Agent, or Firm* — Lucas & Mercanti, LLP

(57) ABSTRACT

An isoindoline derivative of formula (I)

wherein
X is N, C—CN or C—COR$^2$;
Y is a radical having an acidic group or a basic group;
R$^1$ is independently from one another halogen or C$_1$-C$_4$-alkyl, said alkyl is unsubstituted or substituted with halogen;
R$^2$ is C$_1$-C$_4$-alkyl, said alkyl is unsubstituted or substituted with halogen; and
n is 0, 1, 2, 3 or 4,
with the proviso that Y does not include an acidic group if X is C—CN or C—COR$^2$, and compositions containing the same are provided. The isoindoline derivative and the pigment composition are suitable, for example, for coloring high molecular mass organic material, especially paints, printing inks, resist formulations for color filter applications, electrophotographic toners, cosmetics, plastics, films or fibers.

13 Claims, No Drawings

ISOINDOLINE DERIVATIVES

CROSS-REFERENCE TO RELATED APPLICATIONS

This application is a 371 of PCT/EP2020/077323, filed Sep. 30, 2020, which claims the benefit of European Patent Application No. 19200455.4, filed Sep. 30, 2019.

The present invention relates to an isoindoline derivative as well as to a pigment composition containing said isoindoline derivative in combination with an isoindoline pigment. The isoindoline derivative and the pigment composition are suitable, for example, for coloring high molecular mass organic material, especially paints, printing inks, resist formulations for color filter applications, electrophotographic toners, cosmetics, plastics, films or fibers.

BACKGROUND OF THE INVENTION

Pigments, when dispersed in application media, impart color to it. The physical properties of pigments, like particle size, particle size distribution or crystal structure, are some of the parameters that determine the effectiveness and suitability of a particular pigment for a particular application. Such parameters may be influenced by using pigment derivatives.

Pigment derivatives are structurally analogous to pigments and are generally substituted by groups having a specific effect. The derivatives are usually added to the pigments to improve coloristic and/or performance properties of a pigment. It is often suitable to use pigment derivatives having the same or similar chromophore as the organic pigment.

Isoindoline pigments, especially having a barbituric skeleton, may tend to discolor or enlarge their crystal size when exposed to heat during processing, for example, during extrusion or manufacturing color filters, etc. Thus, temperatures above 200° C. may negatively affect the desired particle size and thus the coloristics. Especially, the use of isoindoline pigments in color filter applications needs very small pigment particles.

Further, isoindoline pigments do not always meet the requirements with respect to their rheological properties, for example, in printing inks.

Commonly used pigments of this class are, for example, C.I. (Color Index) Pigment Yellow 139 and C.I. Pigment Yellow 185. For example, a commercially available Pigment Yellow 139 is Irgaphor® Yellow S 2150 CF suitable for use in color filter applications. However, said pigment may often not satisfy the requirement of a high contrast ratio as desired in color filter applications.

Compositions containing specific derivatives based on isoindoline chromophores are known in the art.

US 2009/0017273 A1 discloses pigment dispersion liquids for use of color filter applications. For example, a dispersion for a red color filter segment comprising Pigment Red 254, Pigment Yellow 139 and a sulfonated isoindoline derivative of formula (V) is described as having nearly no viscosity change after one week. The resist formulation comprising said dispersion shows good developability.

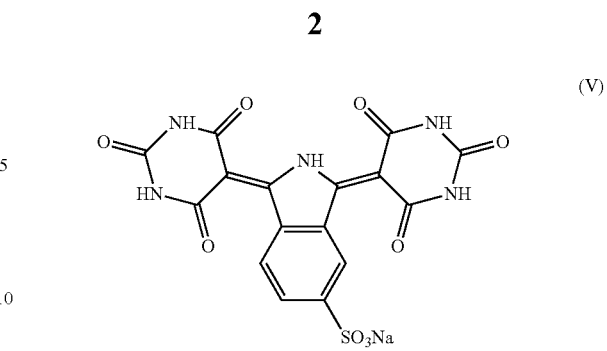

JP 2012-236882 A discloses yellow photosensitive resin compositions for color filters containing a sulfonated pigment derivative based on Pigment Yellow 139 of formula (VI) in combination with Pigment Yellow 150. They are described as having lower viscosity and better dispersion stability than compositions containing Pigment Yellow 150 and Pigment Yellow 139.

(VI)

Compositions based on isoindoline pigments are described, for example, in U.S. Pat. No. 4,764,217. The composition containing Pigment Orange 66 and a monosulfonated isoindoline compound, for example, a compound of formula (VII), is described to provide strong orange surface coatings of high luster and good allround resistances, when incorporated in an alkyd paint system. However, said structure is usually not compatible in terms of color with a yellow isoindoline bearing a barbituric skeleton.

(VII)

US 2016/0327710 A1 discloses a colored composition for a color filter comprising a halogenated zinc phthalocyanine pigment (Pigment Green 58), Pigment Yellow 150 and an acidic isoindoline derivative of formula (VIII) as a pigment dispersant. The generation of acicular crystals during heating the color filter segments can be effectively suppressed by using an epoxy-group containing compound in combination with phthalimide. The acidic derivatives usually impart an undesired reddish shift to the color filter point.

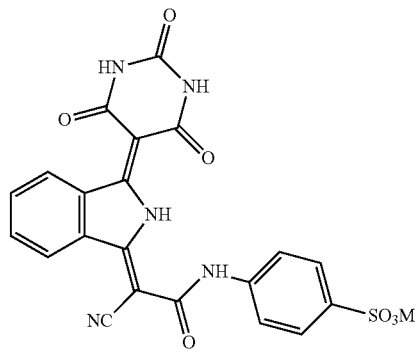

Similar acidic isoindoline derivatives are disclosed in in JP 2006-146078 A. The color filter compositions based on Pigment Yellow 185 and Pigment Yellow 139 are described having good dispersion and storage stability and high contrasts. The acidic derivatives usually impart an undesired reddish shift to the color filter point.

JP 2019 113671 A discloses a colouring composition for color filters containing an organic pigment and a pigment dispersant of formula (1) wherein B may represent a pyrimidine-2,4,6-trione, X1 represents —O— or —NH—, Y represents an alkylene or an arylene and R1 represents an optionally substituted alkyl. JP 2018 062644 A discloses a colouring composition comprising the compounds, which can be used in a color filter. JP 2007 112876 A discloses an isoindoline pigment, which can be used in a color filter. U.S. Pat. No. 4,866,113 A discloses a pigment, which is suitable for pigmenting polymeric material or printing inks. GB 2177105 A discloses the pigment of formula (III) wherein R may represent —CONH$_2$ or 2-benzimidazolyl. U.S. Pat. No. 4,340,735 A discloses the pigment which can be used in printing inks and plastics. DE 29 36 748 A1 discloses the compound of formula (I) wherein Y may represent a pyrimidine-2,4,6-trione. U.S. Pat. No. 4,237,293 A discloses a compound wherein X corresponds to N, which can be used in printing inks.

However, the pigment compositions based on isoindoline pigments do not meet all requirements necessary for applications like color filter, ink or plastics applications, for example, high color saturation, precise color point, high transmittance, a high contrast ratio, thermal stability, ease of processability, like high dispersibility and high dispersion stability.

Hence, there is still a need for a pigment derivative which suitably improves the coloristic properties of isoindoline pigments, especially isoindoline pigments having a barbituric skeleton, in various application media.

Therefore, it is an object of the present invention to provide a pigment derivative which regulates the crystal size of an isoindoline pigment and/or the rheology behavior of a composition based on an isoindoline pigment.

Further, it is an object of the present invention to provide a pigment composition based on an isoindoline pigment having improved coloristics, in particular improved color strength and/or being coloristically close to yellow pigments, especially Pigment Yellow 139 or Pigment Yellow 185.

Further, it is an object of the present invention to provide a pigment composition for producing a color filter which exhibits improved coloristic properties, especially a high contrast ratio, when subjected to a thermal treatment during the processing phase (from application of the dispersion to complete hardening).

Further, it is an object of the present invention to provide a pigment composition for producing a color filter or a printing ink, which is easily processible.

Further, it is an object to provide a pigment derivative to be used as a growth inhibitor and/or a rheology modifier, for example, for a composition based on an isoindoline pigment, in particular based on Pigment Yellow 139 or Pigment Yellow 185.

Further, it is an object to provide a colorant, especially for shading various pigments, especially a red, an orange, a green or a blue pigment.

SUMMARY OF THE INVENTION

It has now been found that an isoindoline derivative is useful as a growth inhibitor for an isoindoline pigment and/or as a rheology modifier in a composition containing an isoindoline pigment. Further, the isoindoline derivative is suitable as a colorant, especially as a pigment.

Accordingly, in a first aspect the invention relates to an isoindoline derivative of formula (I)

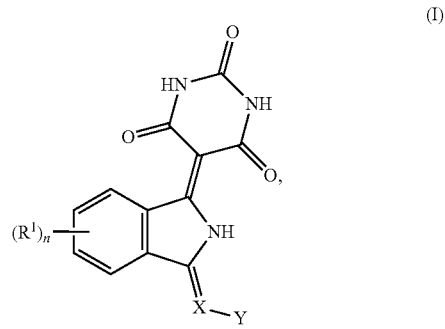

where
X is N, C—CN or C—COR$^2$;
Y is a radical having an acidic group or a basic group;
R$^1$ is independently from one another halogen or C$_1$-C$_4$-alkyl, said alkyl is unsubstituted or substituted with halogen;
R$^2$ is C$_1$-C$_4$-alkyl, said alkyl is unsubstituted or substituted with halogen; and
n is 0, 1, 2, 3 or 4,
with the proviso that Y does not comprise an acidic group if X is C—CN or C—COR$^2$.

In a further aspect, the invention relates to a pigment composition comprising
(a) an isoindoline derivative of formula (I), as defined herein, and
(b) an isoindoline pigment.

In a further aspect, the invention relates to a process for preparing an isoindoline derivative, as defined herein, which process comprises reacting 1,3-diimino-isoindoline, an amino compound of formula H$_2$N—Y (IV), and barbituric acid at a pH≤7.

In a further aspect, the invention relates to the use of an isoindoline derivative, as defined herein, or a pigment composition, as defined herein, for coloring a high molecular mass organic material.

In a further aspect, the invention relates to the use of an isoindoline derivative, as defined herein, as a crystal growth inhibitor or as a rheology improving agent for an isoindoline pigment.

In a further aspect, the invention relates to a color filter which is manufactured with a resist formulation comprising a pigment composition, as defined herein, or an isoindoline derivative, as defined herein.

In a further aspect, the invention relates to a process for coloring a high molecular mass organic material, wherein an isoindoline derivative, as defined herein, or a pigment composition, as defined herein, is added to the high molecular mass organic material.

DETAILED DESCRIPTION OF THE INVENTION

Alkyl, e.g., $C_1$-$C_4$-alkyl, may be within the given limits of carbon atoms linear or branched, where possible. Examples are methyl (Me), ethyl (Et), n-propyl, isopropyl, n-butyl, s-butyl, isobutyl and t-butyl, preferably methyl and ethyl, more preferably methyl. Each alkyl may be substituted one or more times with halogen, for example, I, Br, Cl or F, preferably Cl.

Alkylene, e.g., $C_1$-$C_6$-alkylene or $C_1$-$C_4$-alkylene, preferably $C_1$-$C_4$-alkylene, may be derived from above-defined alkyl by abstracting a hydrogen atom from any terminal carbon atom of the alkyl. Examples are methylene, 1,2-ethandiyl, 1,1-ethandiyl, 1,1-propandiyl, 1,2-propandiyl, 2,2-propandiyl, 1,3-propandiyl, 2-methyl-2,3-propandiyl, 1,1-butandiyl, 1,2-butandiyl, 2,2-butandiyl, 2,3-butandiyl, 1,3-butandiyl, 1,4-butandiyl, 1,5-pentandiyl and 1,6-hexandiyl. These alkylene groups may contain one or more groups of NH.

Heteroaryl, e.g., $C_3$-$C_{18}$-heteroaryl or $C_6$-$C_{18}$-heteroaryl, may be within the given limits of carbon atoms benzofuranyl, isobenzofuranyl, xanthenyl, dibenzofuranyl, pyrrolyl, imidazolyl, pyrazolyl, pyridyl, bipyridyl, triazinyl, pyrimidinyl, pyrazinyl, isoindolyl, indolyl, 3H-indolyl, quinoxalinyl, indazolyl, chinolyl, isochinolyl, phthalazinyl, naphthyridinyl, carbazolyl, benzoxazolyl, benzthiazolyl, benzisothiazol, benzimidazolyl, phenazinyl, phenothiazinyl, or phenoxazinyl. Each heteroaryl may be unsubstituted or substituted one or more times with halogen or $C_1$-$C_4$-alkyl. The term "Heteroaryl" may also include a combination of the above mentioned heteroaryl groups and arylene groups like 1,3-phenylene, 1,4-phenylene, 1,8-naphthylene, 1,4-naphthylene or 2,6-napthylene.

Halogen (Hal) denotes I, Br, Cl, or F, preferably Cl on alkyl and Cl or Br on aryl.

Examples of a 5- or 6-membered ring formed by D and $R^4$ are heterocycloalkanes or heterocycloalkenes having 3 to 6 carbon atoms and optionally one additional hetero atom selected from O, S or $NR^7$.

Examples of a 5- or 6-membered ring formed by $R^5$ and $R^6$ are heterocycloalkanes or heterocycloalkenes having 3 to 6 carbon atoms and optionally one $NR^8$.

Suitable examples for such 5- or 6-membered rings are

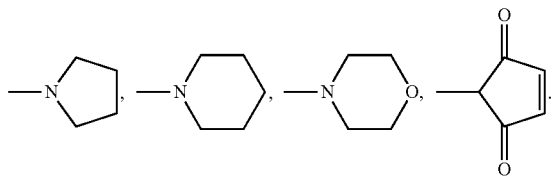

The term "substituted" means "substituted one or more times with", i.e., 1 to 3 times, where possible, preferably 1 or 2 times, more preferably 1 time. If a substituent occurs more than once in a group, it may be different in each occurrence.

The isoindoline derivative of formula (I) is preferably a colorant of formula (I).

The radical $(R^1)_n$ is preferably a radical, wherein n is 0, or a radical $(R^1)_n$, wherein $R^1$ is Cl, Br or methyl, and n is 1 or 2, especially 1. More preferably, the radical $(R^1)_n$ is a radical, wherein n is 0.

Accordingly, the isoindoline derivative is preferably an isoindoline derivative of formula (I), where n is 0.

The acidic group may be selected from COOH, a salt thereof, $SO_3H$ or a salt thereof, for example, a $SO_3H$ group or a salt thereof. The acidic group may be present one or more times, more preferably one or two times, especially one time. For example, one $SO_3H$ or a salt thereof is present within the isoindoline derivative of formula (I).

The radical =X—Y within formula (I) may be, for example, =N—Y.

Accordingly, in a preferred embodiment the isoindoline derivative is of formula (I)

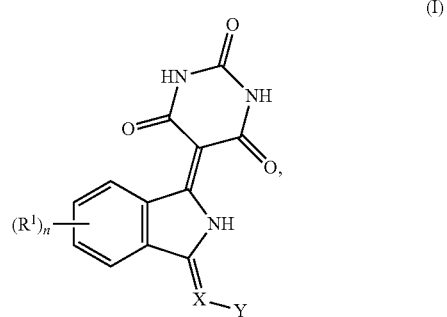

where
X is N;
Y is a radical having an acidic group or a basic group;
$R^1$ is independently from one another halogen or $C_1$-$C_4$-alkyl, said alkyl is unsubstituted or substituted with halogen; and
n is 0, 1, 2, 3 or 4, preferably n is 0, 1 or 2, more preferably n is 0.

The radical =X—Y within formula (I) may be, for example, =N—Y, where Y is a $C_6$-$C_{18}$-aryl or $C_3$-$C_{18}$heteroaryl radical which is substituted with COOH, a salt thereof, $SO_3H$ or a salt thereof. The $C_6$-$C_{18}$-aryl or $C_3$-$C_{18}$heteroaryl radical may further be substituted, for example, with halogen, $C_1$-$C_4$-alkyl or a group of

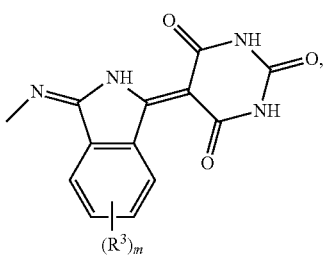

where
R³ independently from one another halogen or $C_1$-$C_4$-alkyl, said alkyl is unsubstituted or substituted with halogen; and m is 0, 1, 2, 3 or 4.

Accordingly, in a preferred embodiment the isoindoline derivative is of formula (I), where X is N;
Y is a $C_6$-$C_{18}$-aryl or $C_3$-$C_{18}$-heteroaryl radical which is substituted with COOH, a salt thereof, $SO_3H$ or a salt thereof and optionally substituted with halogen, $C_1$-$C_4$-alkyl or a group of (II)

where
R³ independently from one another halogen or $C_1$-$C_4$-alkyl, said alkyl is unsubstituted or substituted with halogen; and
m is 0, 1, 2, 3 or 4.

The radical $(R^3)_m$ is preferably a radical, wherein m is 0, or a radical $(R^3)_m$, wherein R³ is Cl, Br or methyl, and m is 1 or 2, especially 1. More preferably, the radical $(R^3)_m$ is a radical, wherein m is 0.

For example, the isoindoline derivative is of formula (I), where X is N;
Y is phenyl, naphthyl or biphenylyl, which is substituted with COOH, a salt thereof,
$SO_3H$ or a salt thereof; and optionally substituted with Br, Cl or methyl.

Preference is given to an isoindoline derivative of formula (I), where X is N; and
Y is phenyl or naphthyl, which is substituted with $SO_3H$ or a salt thereof.

Examples of the $C_6$-$C_{18}$-aryl radical, which is substituted with an acidic group, may be a radical of formula (IXa)

(IXb)

(IXc)

(IXd)

(IXe)

(IXf)

(IXg)

(IXh)

where R⁹ may be independently from one another and in each occurrence selected from Cl, Br or methyl, and p may be 0, 1 or 2, especially p is 0 or 1.

In particular, p is 0.

Examples of the $C_3$-$C_{18}$-heteroaryl radical, which is substituted with an acidic group, may be a radical of formula (Xa)

(Xb)

(Xc)

(Xd)

-continued

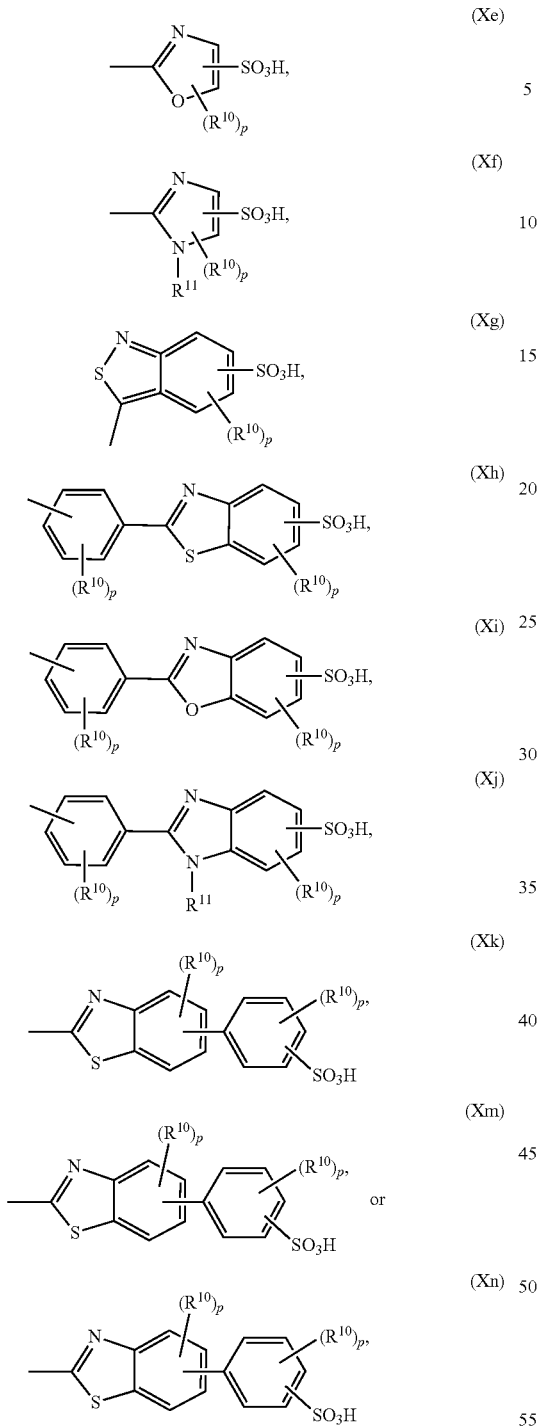

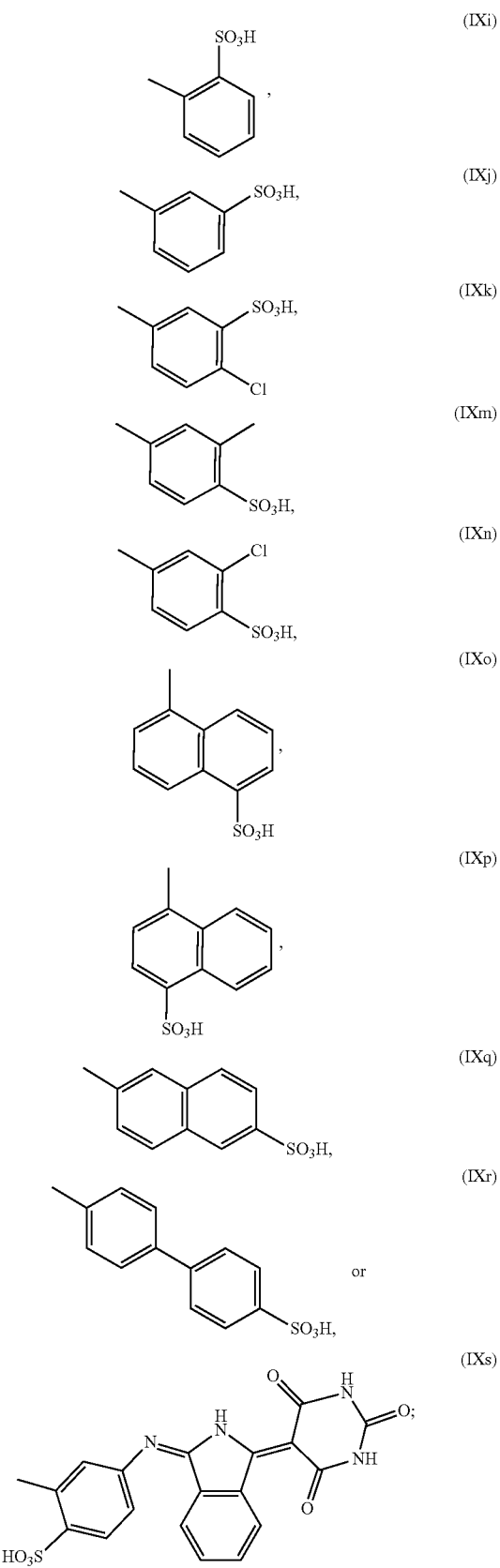

where $R^{10}$ may be independently from one another and in each occurrence selected from Cl, Br or methyl, and p may be 0, 1 or 2, especially p is 0 or 1, in particular, p is 0;

$R^{11}$ is hydrogen or $C_1$-$C_4$-alkyl;

or a corresponding radical of formulae (Xa)-(Xn), wherein the acidic group is COOH instead of $SO_3H$.

Preferred examples of the $C_6$-$C_{18}$-aryl radical, which is substituted with an acidic group, may be a radical of formula or a corresponding radical of formulae (IXi) to (IXs), wherein the acidic group is COOH instead of $SO_3H$.

More preferred examples of the $C_6$-$C_{18}$-aryl radical, which is substituted with an acidic group, may be a radical of formulae (IXi) to (IXs) having a $SO_3H$ group.

Preferred examples of the $C_6$-$C_{18}$-heteroaryl radical, which is substituted with an acidic group, may be a radical of formula

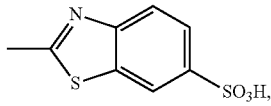
(Xo)

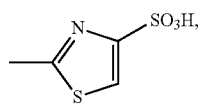
(Xp)

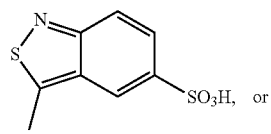
(Xq)

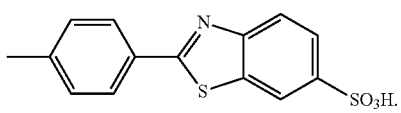
(Xr)

or a corresponding radical of formulae (Xo) to (Xr), wherein the acidic group is COOH instead of $SO_3H$.

More preferred examples of the $C_6$-$C_{18}$-aryl radical, which is substituted with an acidic group, may be a radical of formulae (IXi) to (IXs) having a $SO_3H$ group.

The radical =X—Y within formula (I) may be, for example, a radical of formula

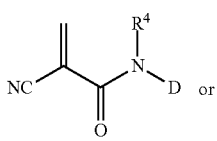
(XI)

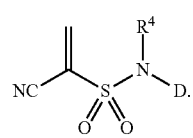
(XII)

Alternatively, the radical =X—Y within formula (I) may be, for example, a radical of formula

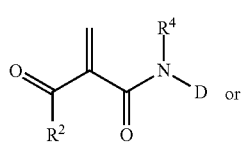
(XIII)

(XIV)

where
$R^2$ is $C_1$-$C_4$-alkyl, which is unsubstituted or substituted with halogen;
$R^4$ is H or $C_1$-$C_4$-alkyl; and
D comprises a basic group, preferably an amino group.

Accordingly, in a preferred aspect, the invention relates to an isoindoline derivative of formula (I), where
X is C—CN or C—$COR^2$;
Y is a radical of formula -A-D (III), where
A is —CO—$NR^4$— or —$SO_2$—$NR^4$—;
D is —($C_1$-$C_6$-alkylene)-$NR^5R^6$ or —($C_1$-$C_6$-alkylene)-NH—$NR^5R^6$, said $C_1$-$C_6$-alkylene may be interrupted by NH;
$R^2$ is $C_1$-$C_4$-alkyl;
$R^4$ is H or $C_1$-$C_4$-alkyl;
or D and $R^4$ together with the linking nitrogen form a 5- or 6-membered ring, said 5- or 6-membered ring may be substituted by $C_1$-$C_4$-alkyl and/or interrupted by $NR^7$, O or S;
$R^5$ and $R^6$ are independently from one another H or $C_1$-$C_4$-alkyl;
or $R^5$ and $R^6$ together with the linking nitrogen form a 5- or 6-membered ring, said 5- or 6-membered ring is interrupted by $NR^8$ and is optionally substituted by $C_1$-$C_4$-alkyl;
$R^7$ is H or $C_1$-$C_4$-alkyl; and
$R^8$ is H, $C_1$-$C_4$-alkyl or phenyl.

The radical D may be, for example, —($C_1$-$C_4$-alkylene)-N($C_1$-$C_4$-alkyl)$_2$, preferably —($C_2$-$C_4$-alkylene)-N($C_1$-$C_4$-alkyl)$_2$.

The radical $R^4$ is preferably H, methyl or ethyl, especially H.

Further preferred is an isoindoline derivative of formula (I), where
X is C—CN;
Y is a radical of formula -A-D (III), where
A is —CO—$NR^4$—;
D is —($C_1$-$C_6$-alkylene)-$NR^5R^6$ or —($C_1$-$C_6$-alkylene)-NH—$NR^5R^6$, said $C_1$-$C_6$-alkylene may be interrupted by NH;
$R^4$ is H or $C_1$-$C_4$-alkyl;
or D and $R^4$ together with the linking nitrogen form a 5- or 6-membered ring, said 5- or 6-membered ring may be substituted by $C_1$-$C_4$-alkyl and/or interrupted by $NR^7$, O or S;
$R^5$ and $R^6$ are independently from one another H or $C_1$-$C_4$-alkyl;
or $R^5$ and $R^6$ together with the linking nitrogen form a 5- or 6-membered ring, said 5- or 6-membered ring is interrupted by $NR^8$ and is optionally substituted by $C_1$-$C_4$-alkyl;
$R^7$ is H or $C_1$-$C_4$-alkyl; and
$R^8$ is H, $C_1$-$C_4$-alkyl or phenyl.

Further preferred is an isoindoline derivative of formula (I), where
X is C—CN;
Y is a radical of formula -A-D (III), where
A is —CO—$NR^4$— or —$SO_2$—$NR^4$—;

D is —(C$_1$-C$_6$-alkylene)-NR$^5$R$^6$, said C$_1$-C$_6$-alkylene may be interrupted by NH;

R$^4$ is H; and

R$^5$ and R$^6$ are independently from one another H or C$_1$-C$_4$-alkyl, preferably methyl, ethyl, propyl or butyl.

Further preferred is an isoindoline derivative of formula (I), where

X is C—CN;

Y is a radical of formula -A-D (III), where

A is —CO—NR$^4$—;

D is —(C$_1$-C$_4$-alkylene)-NR$^5$R$^6$;

R$^4$ is H; and

R$^5$ and R$^6$ are independently from one another C$_1$-C$_4$-alkyl, preferably methyl, ethyl, propyl or butyl.

Examples of formula -A-D (III) are, for example, —SO$_2$NH(CH$_2$)$_3$N(CH$_3$)$_2$, —SO$_2$NH(CH$_2$)$_3$N(C$_2$H$_5$)$_2$, —SO$_2$NH(CH$_2$)$_3$N(nC$_4$H$_9$)$_2$, —CONH(CH$_2$)$_3$N(CH$_3$)$_2$, —CONH(CH$_2$)$_3$N(C$_2$H$_5$)$_2$, —CONH(CH$_2$)$_3$N(nC$_4$H$_9$)$_2$,

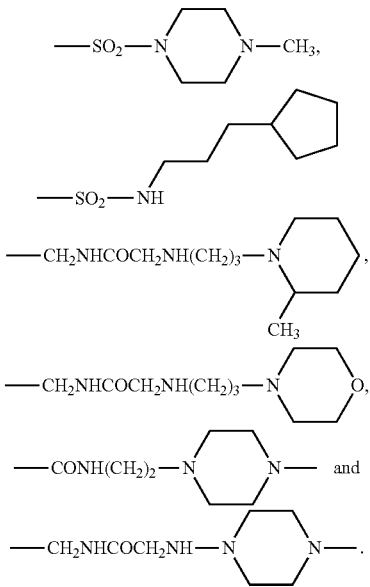

Preferred examples of radicals of formula -A-D (III), may be a radical of formula

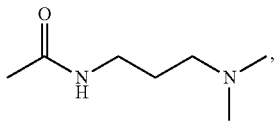
(XVa)

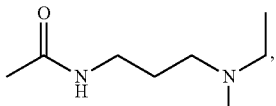
(XVb)

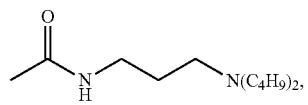
(XVc)

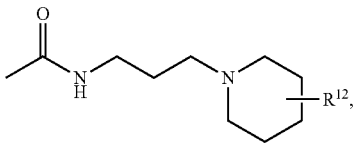
(XVd)

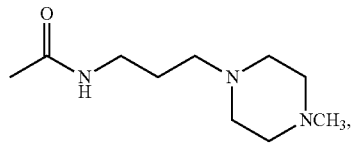
(XVe)

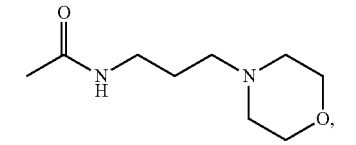
(XVf)

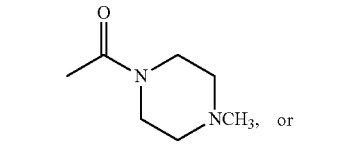
(XVg)

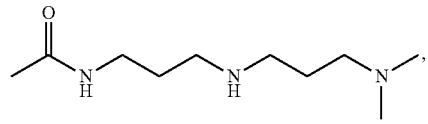
(XVh)

where R$^{12}$ is H or C$_1$-C$_4$-alkyl, preferably H or methyl, especially H.

The isoindoline derivatives may be prepared by reacting 1,3-diimino-isoindoline, an amino compound of formula H$_2$N—Y (IV) and barbituric acid under acidic conditions.

Accordingly, in a further aspect the invention relates to a process for preparing an isoindoline derivative, as defined herein, which process comprises reacting 1,3-diimino-isoindoline, an amino compound of formula H$_2$N—Y (IV), and barbituric acid at a pH≤7.

The process may be carried out as a one-pot reaction, where a suspension of about equimolar amounts of 1,3-diimino-isoindoline, an amino compound of formula H$_2$N—Y (IV) and barbituric acid is reacted usually at a pH≤7, especially in the range of from 2 to 7. In case of isoindoline derivatives of formula (I) with X=N, the process may be more preferably carried out at a pH in the range of from 3 to 6.

The acidic conditions may be adjusted with Broenstedt acids, like acetic acid, formic acid, butanoic acid or sulfuric acid, optionally in a mixture with water. However, Lewis acids may also be used. The acid may be used as solvent, or an additional solvent may be used. Suitable examples of solvents are, for example, alcohols, like methanol, ethanol, isopropanol or butanol, dialcohols like ethylene glycol, diethylene glycol, propylene glycol, water or mixtures thereof.

The reaction is usually performed at temperatures in the range of from 40 to 150° C., in particular 70 to 120° C. The reaction time typically varies from 2 to 24 hours dependent on the amount of acid and/or reaction temperature.

Alternatively, the process may be carried out in a two-step reaction, wherein the reaction comprises a) reacting 1,3-diimino-isoindoline and an amino compound of formula $H_2N$—Y (IV), and
b) reacting the product of step a) with barbituric acid at a pH≤7.

Step a) is usually carried out by reacting about equimolar amounts of 1,3-diimino-isoindoline and the amino compound of formula $H_2N$—Y (IV) at temperatures in the range from room temperature to about 100° C. If desired, suitable examples of solvents are, for example, alcohols, like methanol, ethanol, isopropanol or butanol, dialcohols like ethylene glycol, diethylene glycol, propylene glycol, water or mixtures thereof. The reaction time typically varies from 2 to 24 hours dependent on the reaction temperature.

Step b) is carried out usually at a pH≤7, especially in the range of from 2 to 7. In case of isoindoline derivatives of formula (I) with X=N, the process may be more preferably carried out at a pH in the range of from 3 to 6.

The acidic conditions may be adjusted with Broenstedt acids, like acetic acid, formic acid or sulfuric acid. The acid may be used as solvent, or an additional solvent may be used. Suitable examples of solvents are, for example, alcohols, like methanol, ethanol, isopropanol or butanol, dialcohols like ethylene glycol, diethylene glycol, propylene glycol, water or mixtures thereof.

The reaction is usually performed at temperatures in the range from 40 to 150° C., in particular 70 to 120° C. The reaction time typically varies from 2 to 24 hours dependent on the amount of acid and/or reaction temperature.

The isoindoline derivatives of formula (I) having an acidic group may be obtained in neutral form or at least partially in form of the corresponding ammonium salts, for example, when the reaction is performed in acetic acid. The ammonium counter ion may be replaced by suitable cations by methods known in the art. A suitable cation is, for example, a metal cation, for example, an alkali metal or ½ earth alkali metal cation like sodium, potassium, or ½ calcium, or an organic ammonium ion.

Examples of substituted ammonium cations are $^+N(CH_3)_2(C_{18}H_{37})_2$, $^+NH(CH_3)_2(C_{18}H_{37})$, $^+N(CH_3)_2(C_{12}H_{25})_2$, $^+NH(CH_3)_2(C_{12}H_{25})$, $^+N(CH_3)_2(C_{10}H_{21})_2$, $^+NH(CH_3)_2(C_{10}H_{21})$, $^+N(CH_3)_2(C_8H_{17})_2$, $^+NH(CH_3)_2(C_8H_{17})$, $^+NH(C_8H_{17})_3$, $^+NH(C_{10}H_{21})_3$, $+NH(C_{12}H_{25})_3$ and $^+NH(C_{18}H_{35})_3$.

The isoindoline derivatives of formula (I) having a basic group are usually obtained in neutral form, but may also be transferred in corresponding ammonium compounds.

The isoindoline derivative of formula (I) may be used as a colorant, preferably in a pigmentary form, for example, as a yellow or orange colorant, preferably as a yellow or orange pigment, or as a shading component for a further colorant, like a red, orange, green or blue pigment.

Accordingly, in a preferred aspect the isoindoline derivative, as described herein, is in a pigmentary form.

Suitable pigments to be shaded are, for example, C.I. Pigment Red 242, 254, 255, a DPP pigment based on 3,6-di(4'-bromo-phenyl)-2,5-dihydropyrrolo[3,4-c]pyrrole-1,4-dione or 3,6-di(4'-cyanophenyl)-2,5-dihydropyrrolo[3,4-c]pyrrole-1,4-dione, Pigment Red 177, C.I. Pigment Orange 71, 73, C.I. Pigment Green 7, 36, 58; and C.I. Pigment Blue 15, 15:1, 15:2, 15:3, 15:4, 15:6.

The isoindoline derivatives of formula (I) are generally obtained in a form, suitable for use as a colorant, preferably as a pigment. However, they may also be further treated by a usual conditioning process, like wet milling, salt milling, salt kneading, etc.

Generally, the isoindoline derivatives may be used as a pigment in application media having a pH of about 1 to 9, where they are usually not soluble.

The isoindoline derivative of formula (I) may further be used in combination with a pigment, for example, with an isoindoline pigment.

Accordingly, in a further aspect, the invention relates to a pigment composition comprising
(a) an isoindoline derivative of formula (I), as defined herein, and
(b) an isoindoline pigment.

The isoindoline pigment (b) may be selected from Pigment Yellow 139, Pigment Yellow 185, Pigment Orange 64, Pigment Orange 66, Pigment Orange 69, Pigment Red 260 or a combination thereof.

Preferably, the isoindoline pigment may be selected from Pigment Yellow 139, Pigment Yellow 185 or a combination thereof.

As isoindoline pigment any finished isoindoline pigment may be used for preparing the pigment composition of the invention, for example, finished by commonly used methods for conditioning isoindoline pigments. Alternatively, any commercially available isoindoline pigments may be used. It is also possible to use a crude isoindoline pigment.

The pigment composition as well as the single components are preferably used in a finely divided form, wherein forming of agglomeration should be avoided.

Generally, the pigment composition only comprises minor amounts of any other compounds. Preferably, the pigment composition of the invention consists essentially of components (a) and (b). The amount of optional components like additives or components from the manufacturing process of each component may be of from 0 to 20 wt %, based on the total weight of the pigment composition, preferably 0.1 to 15 wt %.

The pigment composition usually contains (a) the isoindoline derivative of formula (I) in an amount of from 0.5 to 50 wt %, preferably 1 to 20 wt %, more preferably 5 to 15 wt %, based on the total weight of isoindoline pigment (b).

The pigment composition may be prepared by mixing the components (a) and (b) in a desired ratio to form a physical blend.

Alternatively, the pigment composition may be prepared by mixing the components (a) and (b) and subjecting the mixture to a comminution step.

Accordingly, in a further aspect, the invention relates to a process for preparing a pigment composition comprising
(a) an isoindoline derivative of formula (I), and
(b) an isoindoline pigment,
which process comprises mixing the components a) and b) and optionally subjecting the mixture to a comminution step.

In order to obtain the desired application properties of the pigment composition, any step of known process of conditioning or finishing of pigments may be used, depending on the end-use application. The components (a) or (b) or both components may be used, for example, in the form of aqueous press cakes.

Preferably, the comminution step may be carried out by known methods like salt kneading, dry milling in the absence or presence of an inorganic salt, or wet milling, more preferably by wet milling or salt kneading, more preferably by salt kneading.

Salt kneading may be carried out in the presence of an inorganic salt or a salt of an organic acid and an organic liquid in which the pigment and inorganic salt or salt of an organic acid are substantially insoluble. Any kneader for salt kneading known in the art may be used, for example, common double-shaft kneaders, such as Z-blade kneaders, but also single-shaft kneaders, high speed mixers or extruders are likewise possible.

The isoindoline derivative of formula (I) or the pigment composition comprising the isoindoline derivative of formula (I) is/are preferably used in dried form, each having residual amounts of liquids of up to 5 wt %, each based on the respective component.

Suitable salts for salt kneading are water-soluble salts having a solubility of at least 10 g/100 ml in water. Suitable examples are sodium chloride, potassium chloride, calcium chloride, sodium sulfate, aluminum sulfate and the like, with or without water of crystallization. Preferred inorganic salts are sodium chloride and sodium sulfate, more preferably sodium chloride. Typically, technical-grade salts with or without preceding micronization are used. The salts preferably have an average particle size of from 5 to 200 µm, more preferably from 10 to 50 µm. In addition, they appropriately have a solubility of ≤100 mg/l, in particular ≤10 mg/l (in each case at 20° C.), in the organic solvent; they are preferably virtually insoluble therein.

Suitable liquids for use in salt kneading are liquids, preferably organic solvents or low low-melting solids that liquefy during grinding, in which the organic pigment and salt are substantially insoluble, but which enable the physical transformation of the crude pigment to the instant pigment composition. Examples of organic solvents are alcohols, lower organic acids, ethers or oligo- and polyglycol ethers, ketones, aromatic solvents; esters, amides, sulfones or sulfoxides. Particularly suitable solvents are diethylene glycol, triethylene glycol or diacetone alcohol.

Depending on the process of comminution or on the end use, it may be advantageous to add specific amounts of texture improving agents to the pigment composition before or after the comminution step. Suitable texture improving agents are, in particular, fatty acids, for example, stearic acid or behenic acid or amides or salts thereof, plasticisers, waxes, resin acids such as abietic acid, rosins such as natural rosins, modified rosins, amine rosins and polymeric rosins, alkyl phenols or aliphatic alcohols or vicinal dialcohols such as dodecane-1,2-diol. Further, polymeric dispersants are suitable, for example, polymeric dispersants, available under the trade name Disperbyk® 111, 160, 161, 162, 163, 164, 166, 168, 170, 171, 182, 2000, 2001, 2070, 2150, 2163; EFKA® PX 4300, PX 4310, PX 4320, PX 4330, PX 4340, PX 4350, PA 4400, PA 4401, PA 4402, PA 4403, PA 4450, PX 4700, PX 4701, PX 4731, PX 4732, Dispex® Ultra 4585, Solsperse® 24000, 32550, Ajisper® PB-821, PB-822, PB-823 and combinations thereof.

The polymeric dispersants are preferably copolymers. Copolymers can have, for example, repeating units that are derived from polymerisable or polycondensable acids, esters, glycols, isocyanates, nitriles, amides, imides, olefins, epoxides or aziridines.

Copolymers based on acrylates or urethanes are generally used. Preferred polymeric dispersants are block or graft copolymers, usually having pigment affinic groups.

Pigment affinic groups are generally polar groups, preferably N-containing groups. Examples of N-containing groups are secondary amines, tertiary amines or aromatic amines.

Preferred polymeric dispersants are block copolymers, for example, based on acrylates or urethanes, having pigment affinic groups, preferably N-containing groups with pigment affinity.

Preferred are resin acids such as abietic acid, rosins such as natural rosins, modified rosins, amine rosins, polymeric rosins, polymeric dispersants, preferably block copolymers having N-containing groups with pigment affinity, and combinations thereof.

Especially preferred are resin acids such as abietic acid, rosins such as natural rosins, modified rosins, amine rosins and polymeric rosins. Alternatively preferred is a combination of a polymeric dispersant, preferably block copolymers having N-containing groups with pigment affinity, and one component of the group selected from a resin acid or a rosin.

A texture approving agent may be preferably added in an amount of 0.1 to 20 wt %, preferably 2 to 15 wt %, based on the total weight of the pigment composition.

In general, the kneading mass contains, per g of the total mass of the isoindoline pigment and isoindoline derivative of formula (I) and optional additives, like texture improving agents, from 1 to 15 g, preferably from 2 to 15 g of inorganic salt or salt of an organic acid, and from 0.3 to 2 g, preferably from 0.5 to 2 g, of organic liquid.

The kneading temperature is generally of from 20 to 150° C., preferably 30 to 110° C., more preferably 30 to 90° C.

The salt kneading step should be carried out for a sufficient period of time to allow the particles to attain optimum stability, pigmentary size and distribution. The period of time is not critical and may range from 2 to 24 hours, preferably 2 to 12 hours, in particular from 2 to 8 hours.

The speed or rotation rate is appropriately selected in such a way that the kneading mass is moved homogeneously and with uniform shear.

The product resulting after salt kneading may be stirred and granulated in water to remove salt and organic liquid and isolated by common methods, like filtering, washing usually salt free with water and drying, preferably at a temperature of from 50 to 90° C.

Wet milling may preferably be carried out in an aqueous medium, preferably water. Suitable organic solvents for the aqueous medium are in principle the solvents mentioned for salt kneading, preferably water-miscible solvents. Any milling apparatus may be used insofar as it permits temperature control and application of high shear, like pearl mills, ball mills, vibrator mills, sand mills, agitator mills, centrifugal vortex mills, or attritors. Suitable milling media are, for example, steel balls, ceramic beads or glass beads typically having a diameter of from 0.2 to 3 mm, preferably 0.3 to 1.8 mm.

The total amount of the pigment composition in the aqueous medium is advantageously of from 5 to 25 wt %, based on the total weight of the milled paste, preferably 5 to 15 wt %. Preferably, the pigment composition is pre-dispersed in water, to form a uniform aqueous dispersion, typically of from 0.5 to 2 hours, prior to the step of wet milling. The milling temperature is generally of from 10 to 100° C., preferably 20 to 80° C. The speed or rotation rate is appropriately selected in such a way that the milling mass is moved homogeneously and with uniform shear. The milling step should be carried out for a sufficient period of time to allow the particles to attain optimum stability, pigmentary size and distribution, typically dependent on the mode of operation. The period of time is not critical and may range from 30 min to 15 hours, preferably 1 to 10 hours, in particular from 2 to 5 hours.

The product resulting after wet milling may be isolated by common methods, like filtering, washing usually with water and drying, preferably at a temperature of from 50 to 90° C.

Accordingly, in a further preferred aspect, the invention relates to a process for preparing a pigment composition comprising (a) an isoindoline derivative of formula (I), and
(b) an isoindoline pigment,
which process comprises mixing the components a) and b) and subjecting the mixture to a comminution step, preferably by salt kneading or wet-milling, more preferably by salt-kneading.

More preferably, the invention relates to a process for preparing a pigment composition comprising
(a) an isoindoline derivative of formula (I), and
(b) an isoindoline pigment,
which process comprises mixing the components a) and b) and subjecting the mixture to a comminution step, preferably by salt kneading or wet-milling, more preferably by salt-kneading in the presence of a texture improving agent.

Accordingly, in a further preferred aspect, the invention relates to a pigment composition comprising
(a) an isoindoline derivative of formula (I), as defined herein,
(b) an isoindoline pigment, and
(c) a texture improving agent,
wherein the texture approving agent is preferably present in an amount of 0.1 to 20 wt %, more preferably 2 to 15 wt %, based on the total weight of the pigment composition.

Especially preferred is a pigment composition comprising
(a) an isoindoline derivative of formula (I), as defined herein,
(b) an isoindoline pigment, and
(c) a texture improving agent,
wherein the texture approving agent is present in an amount of 0.1 to 20 wt %, more preferably 2 to 15 wt %, based on the total weight of the pigment composition; and wherein the texture improving agent is selected from resin acids, rosins, modified rosins, amine rosins, polymeric rosins, polymeric dispersants, preferably block copolymers having N-containing groups with pigment affinity, or combinations thereof.

The pigment composition of the invention is generally used as solid systems of free-flowing, pulverulent consistency, as granules, or as aqueous presscake, preferably as powder or granules.

The pigment composition comprising (a) and (b) and optionally additives, like a texture improving agent, has generally an average particle size of ≤100 nm, and preferably of from 10 to 100 nm, when used in color filter applications or inkjet ink applications.

In applications like other printing ink applications, coatings or plastics, the particle size may be greater, for example, in the range of 10 to 600 nm, preferably from 40 to 400 nm.

The particle size is understood to be the equivalent diameter of the particles, which can be determined, for example, by means of a Joyce-Loebl disc centrifuge or by dynamic laser radiation scattering. Evaluation of transmission electron microscopy (TEM) images is also often adequate. The averaging of the particle size should be carried out on the basis of weight (that is, plotting the total weight of particles of the same equivalent diameter versus this equivalent diameter for all sizeable particles, the average particle size is the arithmetic mean of the resulting weight distribution—see "basic principles of particle size analysis" by Dr. Alan Rawle, obtainable from Malvern Instruments).

The particle size may be adjusted by means of finishing processes, as described beforehand.

When used as a physical blend, the particle size of the pigment derivative may be obtained by suitably adjusting the synthesis conditions and/or by a further appropriate comminution step. Usually, the isoindoline derivative of formula (I) having the desired particle size is combined with an already finished isoindoline pigment of desired particle size.

The isoindoline derivative of formula (I) or the pigment composition comprising the isoindoline derivative of formula (I) of the invention is outstandingly suitable for all colorant, especially pigment end-use applications, especially coloring organic or inorganic materials of natural and synthetic origin, for example,
a) for mass coloring polymers, e.g. in the form of resins, rubber or plastics including films and fibers;
b) for the preparation of paints, paint systems, for example, in automotive, architectural or industrial paints,
c) printing inks including ink jet inks as well as for toners in electrophotography, e.g. for laser printers, and developers;
d) as an additive to colorants, such as pigments and dyes;
e) for coloring color filter compositions;
and the like.

The pigment composition may be incorporated into various application media by techniques common in the art.

The pigment composition may be used in an amount of from 0.01 to 75 wt %, preferably 0.01 to 50 wt %, based on the total weight of the material to be colored, dependent on the final application.

In a further aspect, the invention relates to the use of the isoindoline derivative, as defined in any aspect hereinbefore, or the pigment composition, as defined in any aspect herein-before, for coloring or pigmenting a high molecular mass organic material, preferably a paint, a printing ink, a resist formulation for color filter applications, an electrophotographic toner, cosmetics, plastics, a film or a fiber.

In a further aspect, the invention relates to a process for coloring a high molecular mass organic material, preferably a paint, a printing ink, a resist formulation for color filter applications, an electrophotographic toner, cosmetics, plastics, a film or a fiber.

In a further aspect, the invention relates to the use of the isoindoline derivative, as defined in any aspect hereinbefore, as a crystal growth inhibitor or as a rheology improving agent for an isoindoline pigment.

The isoindoline derivative of formula (I) may be suitably used as a colorant, preferably as a pigment, in various application media, for example, as a shading component of a further colorant, like a red, orange, green or blue pigment.

The instant pigment composition may be used as a yellow or orange colorant in various application media, preferably in printing inks, plastics or in resist formulations for color filter applications, more preferably as a shading component of a further colorant, like a red or green pigment, for example, for a red or green color filter segment.

Preferably, the pigment composition or the isoindoline derivative of formula (I) is used for coloring a photosensitive resist formulation for manufacturing color filters, especially for elements in the field of display devices.

Accordingly, in a further aspect the invention relates to a color filter manufactured with a resist formulation comprising a pigment composition, as defined in any aspect herein-before, or an isoindoline derivative, as defined in any aspect herein-before.

The components of radiation-curable compositions, especially resist formulations, and the manufacturing thereof are known to one skilled in the art. Preferred methods and components are, for example, described in PCT/EP2019/

066256, WO 2013/179237 A1 or WO 08/101841 A1. Generally, a pigment dispersion is formed by dispersing the instant pigment composition with one or more polymeric dispersants and a solvent. The pigment dispersion is then used for manufacturing a photosensitive resist formulation comprising further a resin, a photopolymerization initiator, an ethylenically unsaturated monomer, a solvent and optional additives. Suitable components are known in the art.

Usually, a color filter is produced by coating the photosensitive resist formulation, as defined herein-before, on a substrate, followed by drying, exposing, developing and optionally post-baking to form a film.

Especially, the resist formulation is colored with a salt-kneaded or wet-milled pigment composition, as mentioned beforehand, preferably with a salt-kneaded pigment composition.

Accordingly, in a preferred aspect the invention relates to a color filter which is manufactured with a resist formulation comprising a salt-kneaded pigment composition, as defined in any aspect herein-before.

The isoindoline derivative of formula (I) is especially suitable for use as a growth inhibitor, preferably in connection with isoindoline pigments. Thus, the pigment compositions are excellent when used in applications when thermal treatment is applied. The desired particle size of the pigment compositions is retained after such treatments.

In addition, the isoindoline derivative of formula (I) is suitable for use as a yellow, orange or red colorant in any application where color is desired.

The compositions, for example, paints and printing inks, containing the instant pigment compositions, compared to compositions without the isoindoline derivatives, have improved coloristic properties, especially improved color strength.

Especially, resist formulations containing the instant pigment compositions provide color filter segments which have a high contrast ratio and also meet other requirements, such as high thermal stability, high color saturation and high brightness. The contrast ratios may be increased when using a salt-kneaded or wet-milled pigment composition, preferably a salt-kneaded pigment composition.

Advantageously, they provide high contrast ratios after being subjected to a thermal treatment of about 230° C. or higher.

When used as shading pigment composition for green and red color filter segments such segments provide a high saturated desired color point with a high transmittance, also after a thermal treatment. Thus, a wide color gamut may be provided.

The resist formulations are easily processible, especially they show high dispersibility. Further, they show high rheological behavior, like high dispersion stability and high re-crystallization stability.

In particular, paints and printing inks containing the instant pigment compositions, have improved rheology behavior and excellent dispersion stability.

The definitions and preferences given for the pigment mentioned herein-before apply in any combination as well as in any combination for the other aspects of the invention.

The present invention is further illustrated by the following set of embodiments and combinations of embodiments resulting from the dependencies and back-references as indicated. In particular, it is noted that in each instance where a range of embodiments is mentioned, for example in the context of a term such as "The isoindoline derivative according to any one of embodiments 1 to 3", every embodiment in this range is meant to be explicitly disclosed for the skilled person, i.e. the wording of this term is to be understood by the skilled person as being synonymous to "The isoindoline derivative of any one of embodiments 1, 2 and 3". Further, it is explicitly noted that the following set of embodiments is not the set of claims determining the extent of protection, but represents a suitably structured part of the description directed to general and preferred aspects of the present invention.

1. An isoindoline derivative of formula (I)

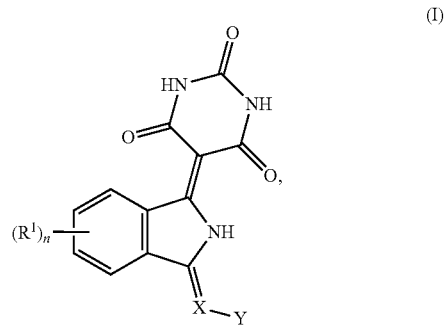

where
X is N, C—CN or C—COR$^2$;
Y is a radical having an acidic group or a basic group;
R$^1$ is independently from one another halogen or C$_1$-C$_4$-alkyl, said alkyl is unsubstituted or substituted with halogen;
R$^2$ is C$_1$-C$_4$-alkyl, said alkyl is unsubstituted or substituted with halogen; and
n is 0, 1, 2, 3 or 4,
with the proviso that Y does not comprise an acidic group if X is C—CN or C—COR$^2$.

2. The isoindoline derivative according to embodiment 1, where
X is N;
Y is a C$_6$-C$_{18}$-aryl or C$_3$-C$_{18}$-heteroaryl radical which is substituted with COOH, a salt thereof, SO$_3$H or a salt thereof and optionally substituted with halogen, C$_1$-C$_4$-alkyl or a radical of

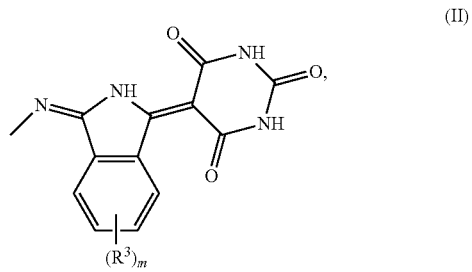

where
R$^3$ independently from one another is halogen or C$_1$-C$_4$-alkyl, said alkyl is unsubstituted or substituted with halogen; and
m is 0, 1, 2, 3 or 4.

3. The isoindoline derivative according to embodiment 2, where
Y is phenyl, naphthyl or biphenylyl, which is substituted with COOH, a salt thereof, SO$_3$H or a salt thereof.

4. The isoindoline derivative according to embodiment 2 or 3, where
Y is phenyl or naphthyl, which is substituted with SO$_3$H or a salt thereof.

5. The isoindoline derivative according to embodiment 1, where
X is C—CN or C—COR$^2$;
Y is a radical of formula -A-D (III), where
A is —CO—NR$^4$— or —SO$_2$—NR$^4$—;
D is —(C$_1$-C$_6$-alkylene)-NR$^5$R$^6$ or —(C$_1$-C$_6$-alkylene)-NH—NR$^5$R$^6$, said C$_1$-C$_6$-alkylene may be interrupted by NH;
R$^2$ is C$_1$-C$_4$-alkyl;
R$^4$ is H or C$_1$-C$_4$-alkyl;
or D and R$^4$ together with the linking nitrogen form a 5- or 6-membered ring, said 5- or 6-membered ring may be substituted by C$_1$-C$_4$-alkyl and/or interrupted by NR$^7$, O or S;
R$^5$ and R$^6$ are independently from one another H or C$_1$-C$_4$-alkyl;
or R$^5$ and R$^6$ together with the linking nitrogen form a 5- or 6-membered ring, said 5- or 6-membered ring is interrupted by NR$^8$ and is optionally substituted by C$_1$-C$_4$-alkyl;
R$^7$ is H or C$_1$-C$_4$-alkyl; and
R$^8$ is H, C$_1$-C$_4$-alkyl or phenyl.

6. The isoindoline derivative according to any one of the preceding embodiments, which derivative is in a pigmentary form.

7. A pigment composition comprising
(a) an isoindoline derivative of formula (I), as defined in any one of embodiments 1 to 6, and
(b) an isoindoline pigment.

8. The pigment composition according to embodiment 9, wherein the isoindoline pigment (b) is selected from Pigment Yellow 139, Pigment Yellow 185, Pigment Orange 64, Pigment Orange 66, Pigment Orange 69, Pigment Red 260 or a combination thereof.

9. The pigment composition according to embodiment 7 or 8, wherein the amount of component (a) is of from 0.5 to 50 wt %, preferably 0.5 to 15 wt %, more preferably 0.5 to 10 wt %, based on the total weight of pigment (b).

10. A process for preparing an isoindoline derivative as defined in any one of embodiment 1 to 6, which process comprises reacting 1,3-diimino-isoindoline, an amino compound of formula H$_2$N—Y (IV), and barbituric acid at a pH≤7.

11. A process according to embodiment 10, wherein the reaction is carried out as a one-pot reaction or in a two-step reaction which two-step reaction comprises
a) reacting 1,3-diimino-isoindoline and an amino compound of formula H$_2$N—Y (IV), and
b) reacting the product of step a) with barbituric acid at a pH≤7.

12. The use of a isoindoline derivative, as defined in any one of embodiments 1 to 6, or a pigment composition, as defined in any one of embodiments 7 to 9, for coloring a high molecular mass organic material, preferably a paint, a printing ink, a resist formulation for color filter applications, an electrophotographic toner, cosmetics, plastics, a film or a fiber.

13. The use of the isoindoline derivative, as defined in any one of embodiments 1 to 6, as a crystal growth inhibitor or as a rheology improving agent for an isoindoline pigment.

14. A color filter which is manufactured with a resist formulation comprising a pigment composition, as defined in any one of embodiments 7 to 9, or an isoindoline derivative as defined in any one of embodiments 1 to 6.

15. A process for coloring a high molecular mass organic material, preferably a paint, a printing ink, a resist formulation for color filter applications, an electrophotographic toner, cosmetics, plastics, a film or a fiber, wherein an isoindoline derivative, as defined in any one of embodiments 1 to 6, or a pigment composition, as defined in any one of embodiments 7 to 9, is added to the high molecular mass organic material.

The present invention will now be explained in more detail with reference to the following examples. These examples should not be construed as limited. Unless otherwise stated, "%" is always % by weight (wt %).

EXAMPLES

Components Used in Examples

Paliotol® Yellow K 1841: Pigment Yellow 139, commercially available from BASF Irgaphor® S2150CF: Pigment Yellow 139, commercially available from BASF Paliotol® Yellow D 1819 (Pigment Yellow 139, commercially available from BASF) 1,3-Diimino-isoindoline (commercially available from Sitaram Chemicals)

Synthesis Example 1 Synthesis of a 1,3-Diimino-Isoindoline Solution

A suspension of 100 g of o-phthalodinitrile (0.76 mol) in 150 ml of methanol was treated with 3.35 ml of a 30% solution of sodium ethanolate at room temperature (20-23° C.). 16.25 g (0.96 mol) of ammoniac gas were then added over 2 hours, and the reaction mixture was slowly heated to 60° C. The mixture was stirred for 2 hours at 60° C. and then cooled down to room temperature. A flux of argon was bubbled through the solution to release any excess of ammoniac to form the solution of diimino-isoindoline.

Example 1 a) 33.8 g (0.19 mol) of sulfanilic acid were added at room temperature to 66 g (0.19 mol) of the solution as prepared in Synthesis Example 1, and 50 ml of methanol were added. The yellowish suspension was stirred overnight at room temperature, followed by stirring at 50° C. for 1 hour. The suspension was cooled to room temperature and filtered. The solid was washed with deionized water and dried at 60° C./100 mbar, yielding 48.4 g of a product of formula (XVIa), which may be present partially as the corresponding ammonium salt. Molecular mass of the product was confirmed by MALDI-TOF-MS (M$^-$ 300 e/z, M$^+$ 302 e/z).

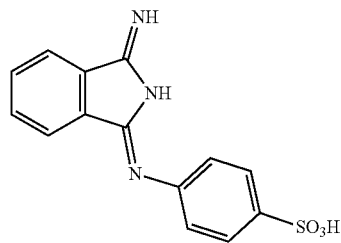
(XVIa)

b) 40.0 g (0.13 mol) of the product of Example 1a) and 16.9 g (0.13 mol) of barbituric acid were suspended in 1 l of glacial acetic acid. The yellow suspension was stirred overnight at 110° C., cooled to 40° C. and filtered. The solid was washed with methanol and dried at 70° C./100 mbar, yielding 48.4 g of a yellow product of formula (XVIb), which may be present partially the corresponding ammonium salt. Molecular mass of the product was confirmed by MALDI-TOF-MS (M⁻ 411 e/z, M⁺ 413 e/z).

yielding 37.3 g of a yellow product of formula (XVIIb), which may be present partially as the corresponding ammonium salt. Molecular mass of the product was confirmed via MALDI-TOF-MS (M⁻ 411 e/z, M⁺ 414 e/z).

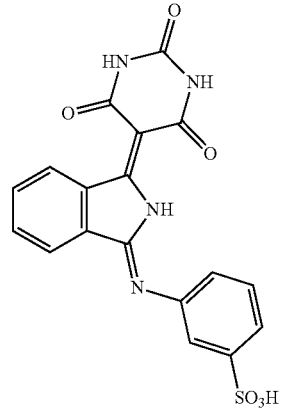

(XVIIb)

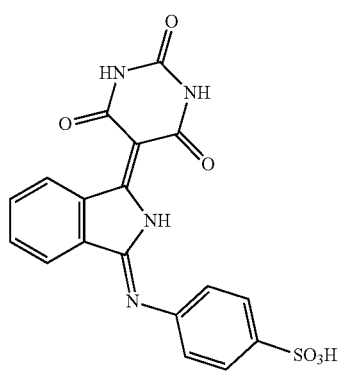

(XVIb)

Example 2 a) 34.3 g (0.19 mol) of 3-aminobenzenesulfonic acid (0.19 mol) were added to 66 g (0.19 mol) of the solution as prepared in Synthesis Example 1 at room temperature, and 50 ml of methanol were added. The yellowish suspension was stirred overnight at room temperature, followed by adding 100 ml of methanol and stirring at 50° C. for 1 hour. The suspension was cooled to room temperature and filtered. The solid was washed with deionized water and dried at 60° C./100 mbar yielding 36.3 g of a product of formula (XVIIa), which may be present partially as the corresponding ammonium salt. Molecular mass of the product was confirmed by MALDI-TOF-MS (M⁻ 300 e/z, M⁺ 302 e/z).

Example 3-1 a) A mixture of 65 g (0.45 mol) of diimino-isoindoline and 100 g (0.45 mol) of 5-amino-naphthosulfonic acid (>90%) were suspended in 350 ml of methanol. The mixture was heated to reflux under stirring. After 5 hours, the mixture was cooled to room temperature, the solid was filtered, washed with 1000 ml of water and dried at 60° C./100 mbar, yielding 87 g of a brownish yellow product of formula (XVIIIa), which may be present partially as the corresponding ammonium salt. Yield 145 g (84%). Molecular mass of the product was confirmed by MALDI-TOF-MS (M⁻ 351 e/z, M⁺ 352 e/z)

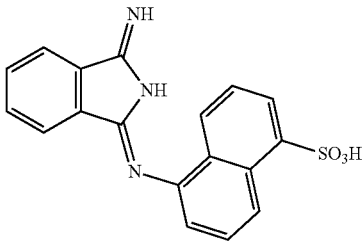

(XVIIIa)

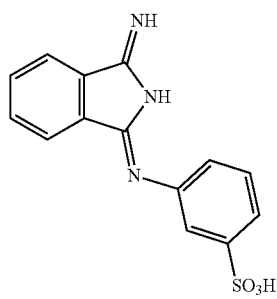

(XVIIa)

b) 30.0 g (0.10 mol) of the product of Example 2a) and 16.9 g (0.10 mol) of barbituric acid were suspended in 500 ml of glacial acetic acid. The yellow suspension was stirred overnight at 110° C., cooled to 40° C. and filtered. The solid was washed with methanol and dried at 70° C./100 mbar b) 100.0 g (0.29 mol) of the product of Example 3a) and 36.5 g (0.29 mol) of barbituric acid were suspended in 350 ml of glacial acetic acid. The suspension was stirred at reflux for 5 hours, then cooled to room temperature and filtered. The brownish yellow solid was washed with 200 ml of water and dried at 80° C./125 mbar, yielding 99 g of a yellowish product of formula (XVIIIb), which may be present partially as the corresponding ammonium salt. Molecular mass of the product was confirmed by MALDI-TOF-MS (M⁻ 461 e/z, M⁺ 463 e/z).

(XVIIIb)

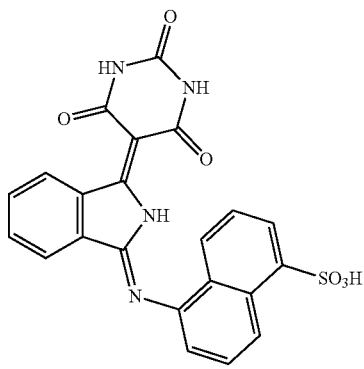

Example 3-2 (One Pot Process)

108.3 g (0.7 mol) of 1,3-diimino-isoindoline were suspended in 1.3 l of glacial acetic acid and 176 g (0.7 mol) of 5-amino-naphthosulfonic acid were added, followed by 94 g (0.7 mol) of barbituric acid. The mixture was stirred overnight and then heated to 100° C. 0.5 l of acetic acid were added, and the mixture was stirred for 7 hours. The mixture was filtered, the solid washed with 350 ml of acetic acid and water. The solid was dried at 70° C./100 mbar for 48 hours, yielding 344 g of a reddish yellow product of formula (XVIIIb), which may be present partially as the corresponding ammonium salt.

Example 4 a) 10 g (0.05 mol) of 2,4-diamino-benzenesulfonic acid (98%) and 15.4 g (0.11 mol) of 1,3-diimino-isoindoline were suspended at room temperature in 100 ml of methanol. The suspension was heated to reflux for 6 hours under stirring. The suspension was cooled to room temperature and filtered. The solid was washed with deionized water and dried at 60° C./100 mbar, yielding 18 g of a product of formula (XIXa), which may be present partially as the corresponding ammonium salt. Molecular mass of the product was confirmed via MALDI-TOF-MS.

(XIXa)

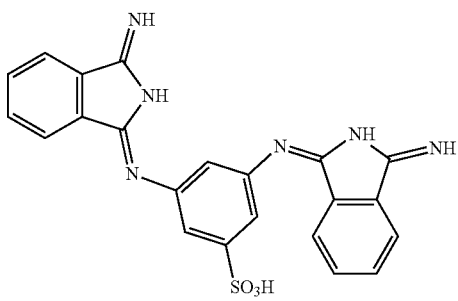

b) 10 g (0.023 mol) of product of Example 7a) and 5.8 g (0.05 mol) of barbituric acid were suspended in 200 ml of acetic acid, and the mixture was heated to reflux for 6 hours under stirring. The brownish suspension was cooled to room temperature, filtered, the solid was washed with 200 ml of water and dried at 70° C./100 mbar, yielding 12.6 g of an orange product of formula (XIXb), which may be present partially as the corresponding ammonium salt. Molecular mass of the product was confirmed via MALDI-TOF-MS.

(XIXb)

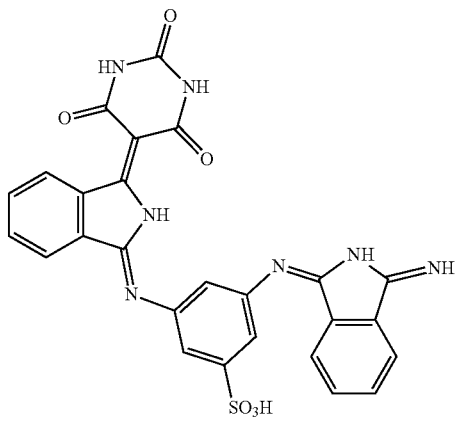

Example 5 a) 26.0 g (0.20 mol) of 3-diethylaminopropylamine were added within 5 min to 19.8 g (0.20 mol) of methyl cyanoacetate under a nitrogen atmosphere. The temperature of the resulting yellow solution rose to 68° C. After stirring overnight at room temperature, the formed methanol was removed by evaporation at 50° C. and 30 mbar, and 33.3 g of a low-viscous yellow oil of 3-diethylaminopropyl cyanoacetamide were obtained. NMR ($^1$H, 400 MHz, CDCl$_3$): 8.94 (1H, br s); 3.42 (2H, m); 3.31 (2H, s); 2.58 (2H, m); 2.57 (4H, q, 7.2 Hz); 1.67 (2H, m); 1.06 (6H, t, 7.2 Hz).

b) 14.5 g (0.10 mol) of 1,3-diimino-isoindoline suspended in 40 g of ethylene glycol were added to a solution of 19.7 g (0.10 mol) of the product of Example 5a) in 180 g of deionized water and stirred overnight at room temperature, whereby a greenish-yellow precipitation was formed. The pH was adjusted to 6.5 by addition of approximately 70 g of 1N sulfuric acid, and a brown solution was formed. Under ice cooling to maintain 20° C., the pH was lowered to 2.0 by further addition of approximately 40 g of 1N sulfuric acid. 12.8 g of barbituric acid were then added, and the mixture was heated to 65° C. while keeping the pH at 2.0-2.1 by dropwise addition of 1N sulfuric acid (approximately 6 g). After stirring for 1 hour at 65° C., the resulting yellow precipitation was cooled in an ice bath to 30° C., filtered and washed with deionized water. After drying at 60° C./150 mbar 38.1 g of product of formula (XX) as a yellow powder was obtained. NMR ($^1$H, 400 MHz, D$_2$SO$_4$): 8.60 (1H, br d);

8.24 (1H, br d); 7.64 (2H, m); 5.79 (ca. 1H, br); 3.45 (2H, m); 2.92 (6H, m); 1.90 (2H, m); 1.02 (6H, t, 7.2 Hz).

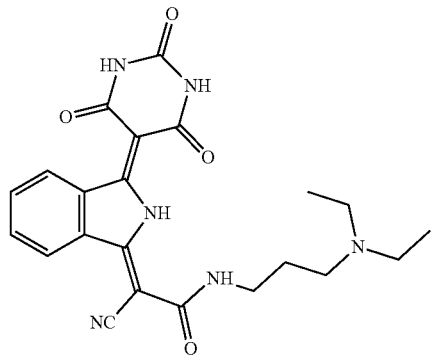

Comparative Example 1 a) 30.0 g (0.17 mol) of sulfanilic acid and 17.6 g (0.16 mol) ethylcyanoacetate (99%) were reacted in a mixture of 50 ml of N-methyl pyrrolidone (NMP) and 50 ml of xylene at 150° C. until the condensation was completed. A mixture of xylene and formed ethanol was distilled over 2 hours. The mixture was heated to 180° C. for 30 min, cooled to 90° C., followed by adding 50 ml of water. After 15 min, 1 equivalent of 1,3-diimino-isoindoline was added, and the resulting mixture was stirred for 1.5 hour at 90° C. and then cooled to 0° C. The resulting yellow suspension was filtered after adding 10 ml of glacial acetic acid, the solid was washed twice with ice water. The yellow product was dried at 60° C./100 mbar yielding 14 g of a product of formula (XXIa), which may be present partially as the corresponding ammonium salt.

ent partially as the corresponding ammonium salt. Molecular mass of the product was confirmed via MALDI-TOF-MS.

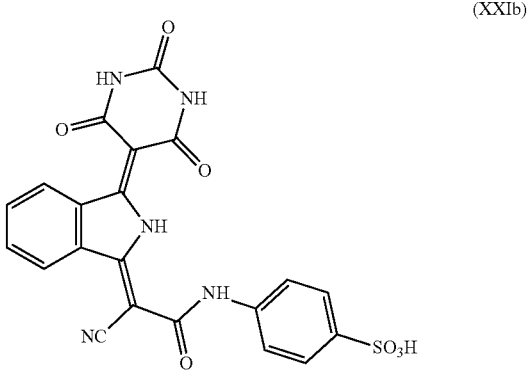 [SMILES: N#C/C(C(=O)Nc1ccc(S(=O)(=O)O)cc1)=c1/[nH]c(=C2C(=O)NC(=O)NC2=O)c2ccccc12]

Comparative Example 2 a) 36.0 g (0.12 mol) of 5-amino-naphthosulfonic acid and 36 g (0.13 mol) ethylcyanoacetate were reacted in a mixture of 100 ml of NMP and 50 ml of xylene at 150° C. until the condensation was completed. A mixture of xylene and formed ethanol was distilled over 3 hours. The mixture was heated to 180° C. for 30 min, cooled to 90° C., followed by adding 50 ml of water. After 15 min 1 equivalent of 1,3-diimino-isoindoline was added, and the resulting mixture was stirred for 1.5 hours at 90° C. and then cooled to 0° C. The resulting yellow suspension was filtered after adding 25 ml of glacial acetic acid, washed with ice water. The brownish red product was dried at 60° C./100 mbar, yielding 21 g of a product of formula (XXIIa), which may be present partially as the corresponding ammonium salt.

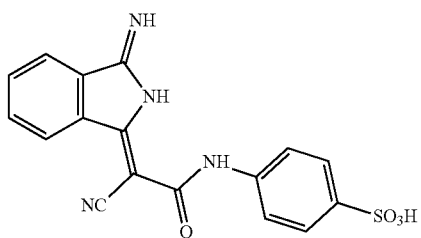

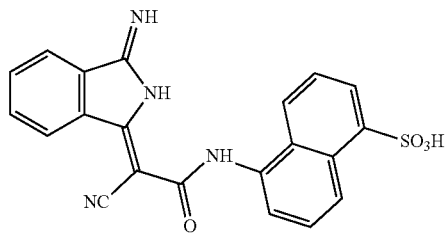

b) A mixture of 13 g (0.04 mol) of compound produced in Comparative Example 1a) and 1 equivalent of barbituric acid were suspended in 200 ml of acetic acid. The mixture was heated to reflux under stirring and became orange. After 6 hours the mixture was cooled to room temperature, stirred for 1 hour, and the solid was filtered, washed twice with 50 ml of water and dried at 60° C./100 mbar, yielding 15 g of yellow-red product of formula (XXIb), which may be presb) A mixture of 18 g (0.05 mol) of the product of Comparative Example 2a) and 6 g (0.05 mol) of barbituric acid were suspended in 200 ml of acetic acid. The mixture was heated to reflux under stirring and became orange. After 6 hours the mixture was cooled to room temperature, stirred for 1 hour, and the solid was filtered, washed twice with 50 ml of water and dried at 60° C./100 mbar, yielding 15 g of orange product of formula (XXIIb), which may be present partially as the corresponding ammonium salt. Molecular mass of the product was confirmed via MALDI-TOF-MS.

(XXIIb)

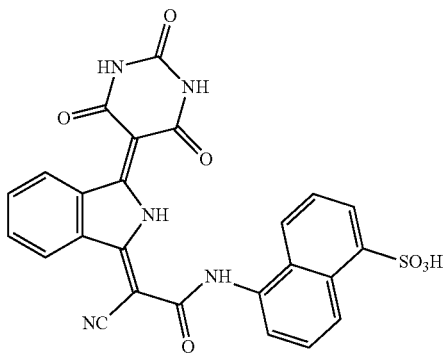

Example 6

A mixture of 80 wt % of Pigment Yellow 139 (Paliotol® K 1841), 10% of product of Example 1 and 10% of abietic resin derivative (rosin amine, CAS 61790-47-4) were converted to a fine pigment composition by kneading under conventional salt kneading conditions (salt/pigment ratio 12:1, in diethylene glycol, at 40° C. within 8 hours).

Examples 7, 8-1, 8-2, 9 and 10

The procedure of Example 6 was repeated with the exception that the products of Examples 2, 3-1, 3-2, 5 and 5 were used instead of the product of Example 1.

Example 11

A mixture of 80 wt % of Pigment Yellow 185 (Paliotol® D 1155), 10% of product of Example 1 and 10% of abietic resin derivative (CAS 61790-47-4) were converted to a fine pigment composition by kneading under conventional salt kneading conditions (salt/pigment ratio 12:1, in diethylene glycol, at 40° C. within 8 hours).

Examples 12, 13-1, 13-2, 14 and 15

The procedure of Example 11 was repeated with the exception that the products of Examples 2, 3-1, 3-2, 4 and 5 were used instead of the product of Example 1.

Example 16

A mixture of 80 wt % of Pigment Yellow 139 (Paliotol® K 1841), 10% of product of Example 3-2 and 7.0% of abietic resin derivative (rosin amine, CAS 61790-47-4) were converted to a fine pigment composition by kneading under conventional salt kneading conditions. After 16 hours 3 wt % of Disperbyk 168 was added (salt/pigment ratio 12:1, in diethylene glycol, at 40° C. within 18 hours).

Comparative Examples 3 and 4

The procedure of Example 6 was repeated with the exception of the products of Comparative Examples 1 and 2 were used instead of the product of Example 1.

Comparative Examples 5 and 6

The procedure of Example 11 was repeated with the exception that the products of Comparative Examples 1 and 2 were used instead of the product of Example 1.

Application Example A: Manufacturing of a Color Filter 1.0 g of the product of Example 8-2 (salt-kneaded product of Example 3-2), 0.8 g of EFKA® 4701 (BASF), 2.38 g of a copolymer (a copolymer of benzyl methacrylate and hydroxyethyl methacrylate with the molar ratio of 6:1, molecular weight $M_w$=~32 kDa, 38 wt % in 1-methoxy-2-propyl acetate) and 12.4 g of 1-methoxy-2-propyl acetate were dispersed in a Skandex® apparatus with zirconium oxide beads (diameter 0.5 mm) for 15 hours. The dispersion was spin-coated onto glass (30 sec at 2000 rpm). Drying was carried out at 80° C. for 5 min, followed by a bake treatment for 15 min on a hot plate at 230° C. to form a clear reddish yellow color filter.

Chromaticity: Chromaticity (Y, x, y) was measured using halogen lamp and calculated with x=0.4640 using a C light source according to 1931 CIE XYZ colorimetric system.

Contrast ratio: The contrast ratio was measured with a contrast ratio measurement device (CT-1, maximum luminance 30,000:1, Tsubosaka Electric Co. Ltd).

The results are listed in Table 1, compared to 1 g of Irgaphor S2150CF.

TABLE 1

|  | Transmittance % | Contrast ratio | x/y |
|---|---|---|---|
| Example 8-2 | 80 | 7300 | 0.4640/0.4890 |
| Example 16 | 82.5 | 8160 | 0.4640/0.4920 |
| Irgaphor®S2150CF | 80.3 | 2120 | 0.4640/0.4900 |
| Comp. Ex. 3 | 81.4 | 4981 | 0.4640/0.4976 |
| Comp. Ex. 4 | 81.5 | 5505 | 0.4640/0.4929 |

The color filters of Example 13-2 and 16 showed a high contrast ratio compared to the Irgaphor S2150CF with a y-value close thereto. No red shift can be observed compared to color filters using Comparative Examples 3 and 4. Comparative Examples 3 and 4 are too red shifted for use as a yellow colorant in color applications, especially as replacement of Irgaphor S2150CF as a currently used pigment.

Application Example B: UV Curable Ink

A millbase was prepared by dispersing a mixture of 25 g of Paliotol® Yellow D 1819 (Pigment Yellow 139, BASF) and 0.5 g of the product of Example 3-1 in an acrylate vehicle in the presence of a polymeric pigment dispersing agent. The dispersing step was carried out in a 400 ml glass jar with 200 g of glass beads in a LAU disperser for 4 hours. The composition of the millbases is mentioned in Table 2 below.

TABLE 2

| Ex. | Millbase | PY 139 | Ex. 3-1 | Laromer PO 9102 | Laromer PE 9105 | Efka PX 4701 |
|---|---|---|---|---|---|---|
| B-1 | B | 25 g | 0.5 g | 56 g | 6 g | 13 g |
| B-2 (comp.) | A | 25 g | — | 56 g | 6 g | 13 g |

The millbase B-1 is of very good quality and shows excellent pigment dispersibility and rheology. After milling, the obtained millbases were separated from the glass beads by sieving. The millbases were then formulated at 12% (identical pigment loading) into a UV-curable ink jet ink by dilution with letdown varnish as mentioned below in Table 3.

TABLE 3

| | Laromer HDDA | Laromer LR 8887 | Irgacure 819 | Irgacure 184 | Irgastab UV 22 | Efka SL 3288 |
|---|---|---|---|---|---|---|
| Letdown varnish | 60 g | 27 g | 6 g | 6 g | 0.5 g | 0.5 g |

The obtained inks were applied onto a self-adhesive vinyl substrate (Orajet 3105) using a 6 μm wire wound bar. The obtained drawdowns were then cured using a UV curing unit (IST) equipped with 2×120 W/cm mercury lamps and the coloristic properties of the dry ink drawdowns are tested using a X-Rite spectrophotometer (D 50/2° observer).

The ink using millbase B-1 offered an improved color strength (106%) versus the ink with millbase B-2 (100%). Both inks were subjected to storage in tightly sealed glass containers in an oven at 60° C. for one week. After one week the inks were inspected for viscosity (Brookfield Rheometer). The ink using millbase B-1 showed no change in viscosity.

The invention claimed is:

1. An isoindoline derivative of formula (I)

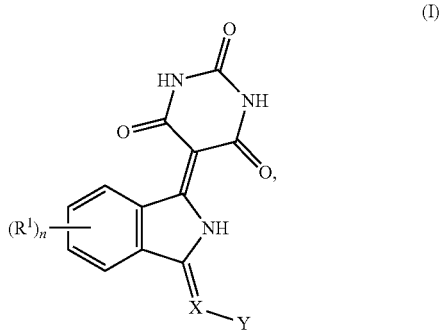

(I)

where
X is N;
Y is a $C_6$-$C_{18}$-aryl radical which is substituted with COOH, a salt thereof, $SO_3H$ or a salt thereof;
$R^1$ is independently from one another halogen or $C_1$-$C_4$-alkyl, said alkyl is unsubstituted or substituted with halogen; and
n is 0, 1, 2, 3 or 4.

2. The isoindoline derivative according to claim 1, where Y is phenyl, or naphthyl, which is substituted with COOH, a salt thereof, $SO_3H$ or a salt thereof.

3. The isoindoline derivative according to claim 1, where Y is phenyl or naphthyl, which is substituted with $SO_3H$ or a salt thereof.

4. The isoindoline derivative according to claim 1, which derivative is in a pigmentary form.

5. A pigment composition comprising
(a) an isoindoline derivative of formula (I), as defined in claim 1, and
(b) an isoindoline pigment.

6. The pigment composition according to claim 5, wherein the isoindoline pigment (b) is selected from Pigment Yellow 139, Pigment Yellow 185, Pigment Orange 64, Pigment Orange 66, Pigment Orange 69, Pigment Red 260 or a combination thereof.

7. The pigment composition according to claim 5, wherein the amount of component (a) is of from 0.5 to 50 wt %, based on the total weight of pigment (b).

8. A process for preparing an isoindoline derivative as defined in claim 1, which process comprises reacting 1,3-diimino-isoindoline, an amino compound of formula $H_2N$—Y (IV), and barbituric acid at a pH≤7.

9. A process according to claim 8, wherein the reaction is carried out as a one-pot reaction or in a two-step reaction which two-step reaction comprises
a) reacting 1,3-diimino-isoindoline and an amino compound of formula $H_2N$—Y (IV), and
b) reacting the product of step a) with barbituric acid at a pH≤7.

10. The pigment composition according to claim 7, wherein the amount of component (a) is of from 0.5 to 15 wt %, based on the total weight of pigment (b).

11. The pigment composition according to claim 10, wherein the amount of component (a) is of from 0.5 to 10 wt %, based on the total weight of pigment (b).

12. A method of inhibiting crystal growth in a isoindoline pigment, comprising mixing an isoindoline pigment with an isoindoline derivative of claim 1.

13. A method improving the rheology of an isoindoline pigment, comprising mixing an isoindoline pigment with an isoindoline derivative of claim 1.

* * * * *